United States Patent [19]
Nakao et al.

[11] Patent Number: 5,661,394
[45] Date of Patent: Aug. 26, 1997

[54] SWITCHING POWER SUPPLY

[75] Inventors: Fumiaki Nakao, Kosai; Tetsuya Suzuki, Tahara-cho; Katsuo Yamada, Kosai; Shoichi Wakao, Hamamatsu, all of Japan

[73] Assignee: FDK Corporation, Tokyo, Japan

[21] Appl. No.: 492,815

[22] Filed: Jun. 20, 1995

[30] Foreign Application Priority Data

Jan. 26, 1995 [JP] Japan .................. 7-010441

[51] Int. Cl.$^6$ .................. G05F 1/656; H02M 7/00
[52] U.S. Cl. .................. 323/222; 363/124
[58] Field of Search .................. 323/222, 282; 363/37, 89, 124

[56] References Cited

U.S. PATENT DOCUMENTS

| | | | |
|---|---|---|---|
| 4,002,965 | 1/1977 | Den Hollander | 323/222 |
| 4,684,859 | 8/1987 | Nohmi et al. | 318/317 |
| 5,072,355 | 12/1991 | Huuillet | 363/89 |
| 5,245,522 | 9/1993 | Kawagychi et al. | 363/37 |
| 5,371,667 | 12/1994 | Nakao et al. | 363/124 |

FOREIGN PATENT DOCUMENTS 4-168975  6/1992  Japan .

*Primary Examiner*—Matthew V. Nguyen
*Attorney, Agent, or Firm*—Wenderoth, Lind & Ponack

[57] ABSTRACT

In a switching power supply a stable dc output voltage having a higher power factor is obtained even for an unstable ac input voltage using a sufficiently broadened duty ratio of the switching signal. The switching power supply include a rectifying circuit 10 for full-wave rectifying an ac input voltage to output a pulsating current, a chopper circuit having a switching device Q1 driven at a sufficiently higher frequency than that of the ac input voltage, an inductor L1 connected in series with the switching device Q1 between output terminals of the rectifying circuit 10, and a capacitor C1 for smoothing a current fed through the inductor L1 to supply a stabilized dc output voltage, an error amplifier 11 and a multiplier 12 for providing a threshold level signal having a full-wave rectified waveform, in which the phase thereof is the same as that of the ac input voltage, and an amplitude corresponding to an error voltage included in an output voltage of the chopper circuit, a comparator 13 for comparing the current of the switching device Q1 with the threshold level signal, and a monostable multivibrator 20 for driving the switching device Q1 according to the output signal of the comparator 13. The turn off time of Q1 becomes shorter when the immediately preceding turn on time becomes longer.

11 Claims, 4 Drawing Sheets

SWITCHING POWER SUPPLY

BACKGROUND OF THE INVENTION

1. Field of the Invention

The present invention relates generally to an electric power supply to convert an ac voltage to a stabilized dc voltage. More specifically, the invention relates to a switching power supply capable of improving a power factor thereof by substantially synchronizing a wave form and a phase of both an input voltage and an input current of a chopper circuit.

2. Description of the Related Art

One example of a switching power supply of power factor improvement type is proposed in a reference, Japanese Patent Laid-open Publication No. 4-168,975, which was filed by the present applicant. As shown in FIG. 4, the reference discloses a power supply having a configuration in which the output of a rectifying circuit 10 for rectifying in full wave, is fed to a boost chopper circuit, thereby a stabilized dc output voltage is obtained.

The chopper circuit in the reference comprises a switching device Q1 driven with sufficiently higher frequency than that of the input ac voltage, an inductor L1 connected in series with the switching device Q1 between output terminals of the rectifying circuit 10, and a diode D1 and a capacitor C1 connected in series between the input and output terminal of the switching device Q1 in order to let an output current flow through the inductor L1 during a turn off time of the switching device Q1. The capacitor C1 has substantially large capacity so that a smoothed and stabilized dc output voltage is supplied therefrom.

An error voltage between an output voltage V2 of the chopper circuit and a reference voltage Vs is detected by an error amplifier 11. The output signal of the amplifier 11, an error signal ΔV, is input to a multiplier 12. An input voltage V1 (i.e., a full-wave rectified input ac voltage) of the chopper circuit is also input to the multiplier 12. The multiplier 12 multiplies V1 of the chopper circuit by ΔV to generate and output a threshold level signal S0 with a full-wave rectified wave form, of which phase is same as that of the input voltage V1 of the chopper circuit, and an amplitude corresponding to the error signal ΔV of the output voltage V2.

The instantaneous value of the current through the switching device Q1 in the chopper circuit is detected by a current sensing resistor R1. A current detection signal S1 measured as a voltage drop of R1 is compared with the threshold level signal S0 by a comparator 13. During a turn on time of Q1, the current through Q1 via the inductor L1 is kept increasing gradually. The current detection signal S1 also increases along with the Q1 current increase and the output signal of the comparator 13 turns HIGH when S1 reaches S0 to trigger a monostable multivibrator 2.

The monostable multivibrator 2 so functions that the output signal thereof is maintained LOW during a constant short time period dt from the trigger point by the output of the comparator 13. After the time period dt, the output signal is set HIGH. The switching device Q1 is so controlled by the monostable multivibrator 2 via a driver 15 that the turn on time of Q1 corresponds to HIGH level of the output of the monostable multivibrator 2, while the turn off time of Q1 corresponds to LOW level of the multivibrator output.

As shown in FIG. 5, the current flowing to the output side from the inductor L1 via the diode D1 gradually decreases after the switching device Q1 turns off.

The OFF time period dt of the switching device Q1 provided by the multivibrator 2 is sufficiently set small so that Q1 is turned on when the current through the inductor L1 is reduced below the threshold level S0 by a certain amount. For this reason, the instantaneous value of the L1 current does not become equal to zero level at its lowest points.

In other words, the switching device Q1 turns on when the current through the inductor L1 decreases by a certain amount, then the current through the inductor L1 and the switching device Q1 gradually increases. At the moment that the current reaches the threshold level S0, Q1 turns off and the L1 current starts to decrease. Repetition of this sequence enables a high frequency ON-OFF switching of the switching device Q1, which is sufficiently higher than the AC input frequency, so that an envelope of the current through the inductor L1 conforms to the threshold level signal S0 having a full-wave rectified wave form.

According to the above construction, since the L1 current varies to follow the threshold level signal S0 without becoming equal to zero level, the peaks of the current of the inductor L1 are sufficiently suppressed.

Furthermore, the switching frequency of the switching device Q1 varies along with the fluctuation of the ON time period of Q1, thus noise spectrum from the chopper circuit is diffused so that noise suppression can be easily accomplished.

In accordance with the above described conventional switching power supply, however, the switching frequency may vary excessively in practical aspect even though advantage of easy noise suppression is still assured. This results in that the duty ratio of the Q1 switching cannot be controlled in a wide range which is sufficient to allow the input voltage and the input current to vary in a same wave form and a same phase. Consequently, the problem may arise that the power factor of the power supply cannot be improved successfully.

Particularly, such a power supply producing a constant dc output of e.g., 380 V for an input ac voltage of, for example, 85 to 264 V may require a broader duty ratio for the switching device.

SUMMARY OF THE INVENTION

In view of the drawbacks in the related art, it is an object of the present invention to provide a switching power supply in which a stable dc output voltage with a higher power factor is obtained even for an unstable ac input voltage by sufficiently broadened duty ratio for the switching device.

Another object of the present invention is to provide a switching power supply in which noise suppression is easily achieved by an appropriate fluctuation of the switching frequency.

In order to accomplish the above-mentioned and other objects, a switching power supply, according to one aspect of the invention, comprises means for full-wave rectifying an ac input voltage, means for switching an output current of the rectifying means, means for providing a target signal to force a dc output voltage to follow a reference voltage, and means for controlling a switching timing of the switching means, the controlling means repeating the operations of turning off the switching means when a switching current of the switching means complies with the target signal and turning on the switching means after a predetermined short period of time which is determined based on the immediately preceding turn on time thereof.

The switching means preferably comprises a switching device driven with sufficiently higher frequency than that of the ac input voltage, an inductor connected in series with the switching device between output terminals of the rectifying means, and a capacitor for smoothing a current fed through the inductor to supply stabilized dc output voltage.

The target signal may have a full-wave rectified wave form, in which the phase thereof is same as that of the ac input voltage, and an amplitude corresponding to difference between the dc output voltage and the reference voltage.

Moreover, the target signal providing means may comprise means for amplifying difference voltage between the dc output voltage and the reference voltage, and means for superimposing output voltage of the amplifying means on output voltage wave form of the rectifying means.

Further, preferably, the switching timing controlling means performs the following steps of shortening a turn off time of the switching means when the immediately preceding turn on time of the switching means becomes longer and lengthening a turn off time of the switching means when the immediately preceding turn on time of the switching means becomes shorter. The switching timing controlling means may comprise, for example, a delay circuit including a series circuit of a capacitor and a resister, and a capacitor defining a supplied current to the delay circuit.

A switching power supply, according to another aspect of the invention, comprises a rectifying circuit for full-wave rectifying ac input voltage to output pulsating current, a chopper circuit comprising a switching device driven with sufficiently higher frequency than that of the ac input voltage, an inductor connected in series with the switching device between output terminals of the rectifying means, and a capacitor for smoothing a current fed through the inductor to supply stabilized dc output voltage, means for providing a threshold level signal having a full-wave rectified wave form, in which the phase thereof is same as that of the ac input voltage, and an amplitude corresponding to an error voltage included in an output voltage of the chopper circuit, and means for controlling switching timing by repeating the operation of turning off the switching device when current therethrough reaches the threshold level signal and turning on the switching device after a predetermined short period of time, the predetermined time period is shortened when the immediately preceding turn on time of the switching means becomes longer and lengthened when the immediately preceding turn on time of the switching means becomes shorter.

Preferably, the switching timing controlling means comprises a comparator comparing the threshold level signal with a current through the switching device and a monostable multivibrator for turning off and on the switching device according to the output signal of the comparator. The monostable multivibrator may further comprise a delay circuit including a series circuit of a capacitor and a resister, and a capacitor defining a supplied current to the delay circuit.

A switching power supply, according to yet another aspect of the invention, comprises a rectifying circuit for full-wave rectifying ac input voltage to output pulsating current, a chopper circuit for switching the pulsating current from the rectifying circuit with high frequency to provide smoothed dc output voltage at the terminals of an output capacitor, a current detection circuit for detecting switching current of the chopper circuit, an operational amplifier for detecting an error voltage of the output voltage of the chopper circuit against reference voltage, a multiplier for multiplying an output voltage error signal from the operational amplifier by an input voltage signal of the chopper circuit, and a switching control circuit for comparing a voltage signal output from the multiplier with a current signal output from the current detection circuit and repeating the operation of turning off the chopper circuit when the current through the switching device in the chopper circuit reaches the voltage signal level and turning on the chopper circuit after a predetermined short period of time, the predetermined time period being shortened when the immediately preceding turn on time of the switching device becomes longer and being lengthened when the immediately preceding turn on time of the switching device becomes shorter. The switching control circuit further comprises, for example, a series circuit of a capacitor and a resister, and a capacitor defining a supplied current to the delay circuit.

As described above, according to one embodiment of the present invention, because the turn off time is shortened when the immediately preceding turn on time of the switching device becomes longer and is lengthened when the immediately preceding turn on time of the switching device becomes shorter, a sufficient turn on time for the switching device is secured to suppress an excessive fluctuation of the switching frequency. In other words, the duty ratio of the switching device can be broadened.

Moreover, since the switching frequency is not fixed but appropriately varied, a noise spectrum of the chopper circuit may be diffused.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF PREFERRED EMBODIMENTS AND BEST MODE FOR CARRYING OUT THE INVENTION

Figure 1:
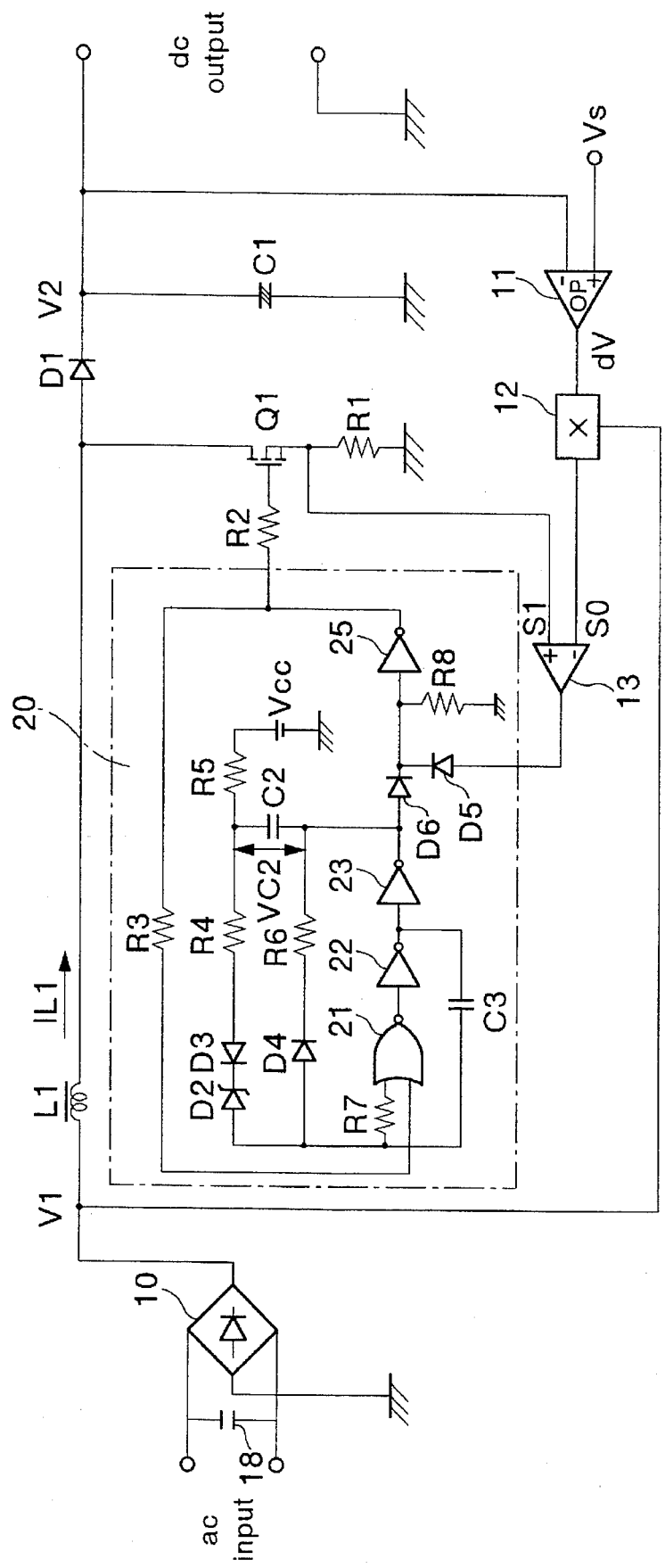
FIG. 1 is a schematic diagram of a switching power supply according to one embodiment of the present invention.
Figure 4:
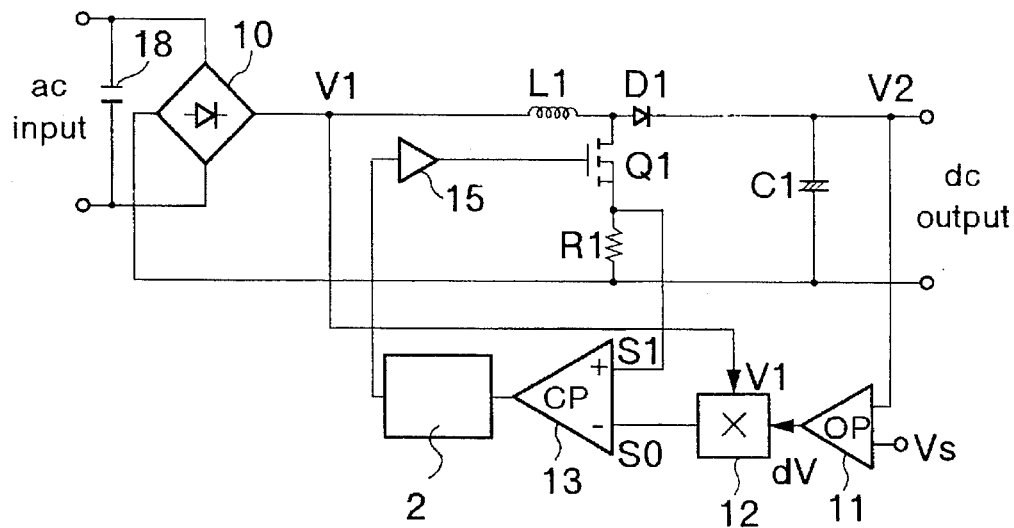
FIG. 4 is a block diagram of a conventional switching power supply.
Figure 5:
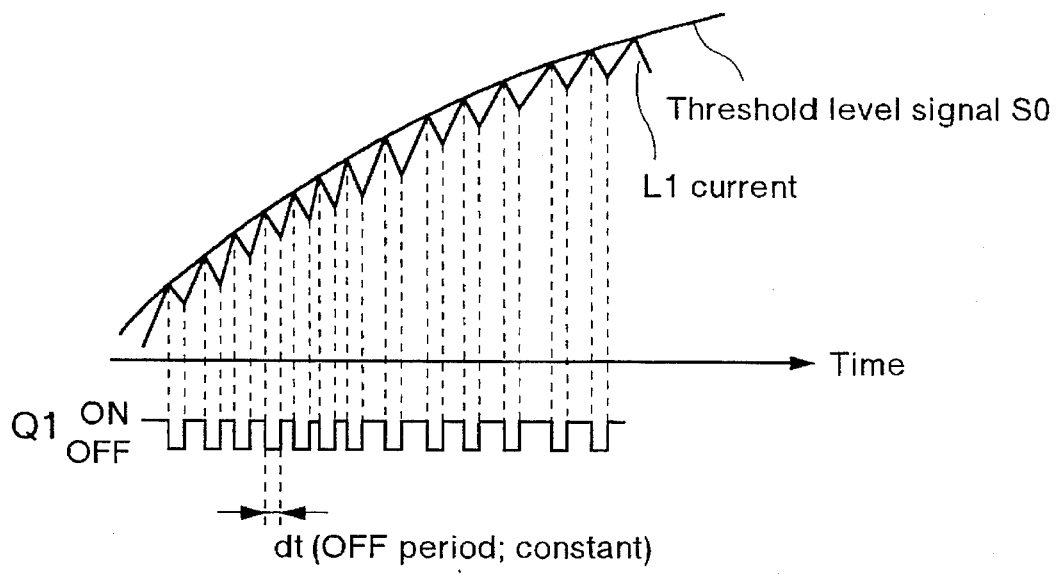
FIG. 5 is a wave form chart of a main portion of the power supply in FIG. 4.

The preferred embodiments of the present invention will be discussed herebelow with reference to the accompanying drawing. FIG. 1 shows a schematic diagram of a preferred embodiment of a switching power supply of the present invention. As shown in FIG. 1, the monostable multivibrator 2 and the driver 15 of the conventional switching power supply in FIG. 4 have been substituted with a monostable multivibrator 20 having a different operating characteristics therefrom, which is a main portion of a switching control circuit of the embodiment. The corresponding portions in FIG. 1 to those in FIG. 4 are labelled with the identical reference symbols.

In FIG. 1, an error amplifier 11 and a multiplier 12 generate a threshold level signal S0, a target signal having a full-wave rectified wave form, in which the phase thereof is same as that of the ac input voltage V1, and an amplitude corresponding to a difference voltage dV for a dc output voltage V2.

The current through the switching device Q1 such as a MOS FET is detected by a shunt resistor R1. The output signal of the comparator 13 is inverted to trigger the multivibrator 20 when the current detection signal 51 reaches the threshold level S0.

The output signal of the multivibrator 20 is maintained LOW level during a predetermined short period of time after the trigger, then inverted to HIGH level. The device Q1 is so controlled to keep ON state while the output signal of the multivibrator 20 stays HIGH and to go to OFF state while the output signal is LOW.

The turn off time of Q1 determined by the monostable multivibrator 20 is set according to the immediately preceding turn on time of Q1. The turn off time is shortened in case that the immediately preceding turn on time becomes longer, while the longer turn off time is set when the immediately preceding turn on time becomes shorter.

When an output signal of an inverter circuit 23 is LOW, a charging voltage of a capacitor C2 is defined by a time period until the output level of the comparator 13 becomes HIGH. Therefore, the turn off time of the switching device Q1 is determined as a discharging time period of C2 through a delay circuit consisting of a resister R4 and a capacitor C3.

The operation of the capacitor C2 and the inductor L1 will be described below in reference to FIG. 2 (a), (b) and FIG. 3 (a) (b).

Figure 2A:
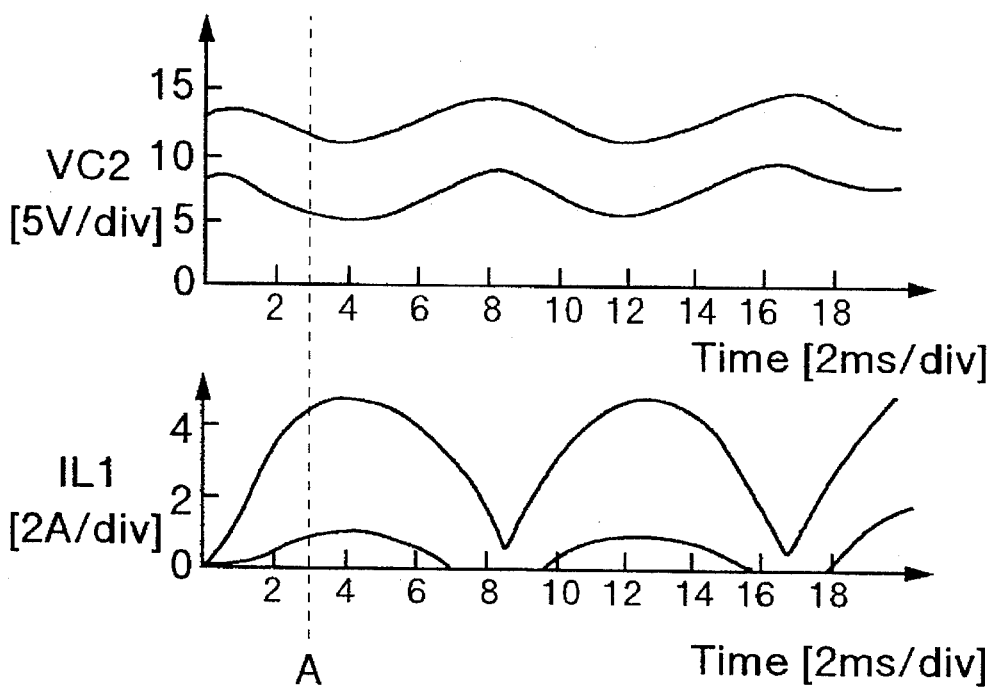
FIG. 2(a) is a wave form chart of a main part of the power supply in FIG. 1 for an ac input voltage of 85 V, 60 Hz, where
Figure 2B:
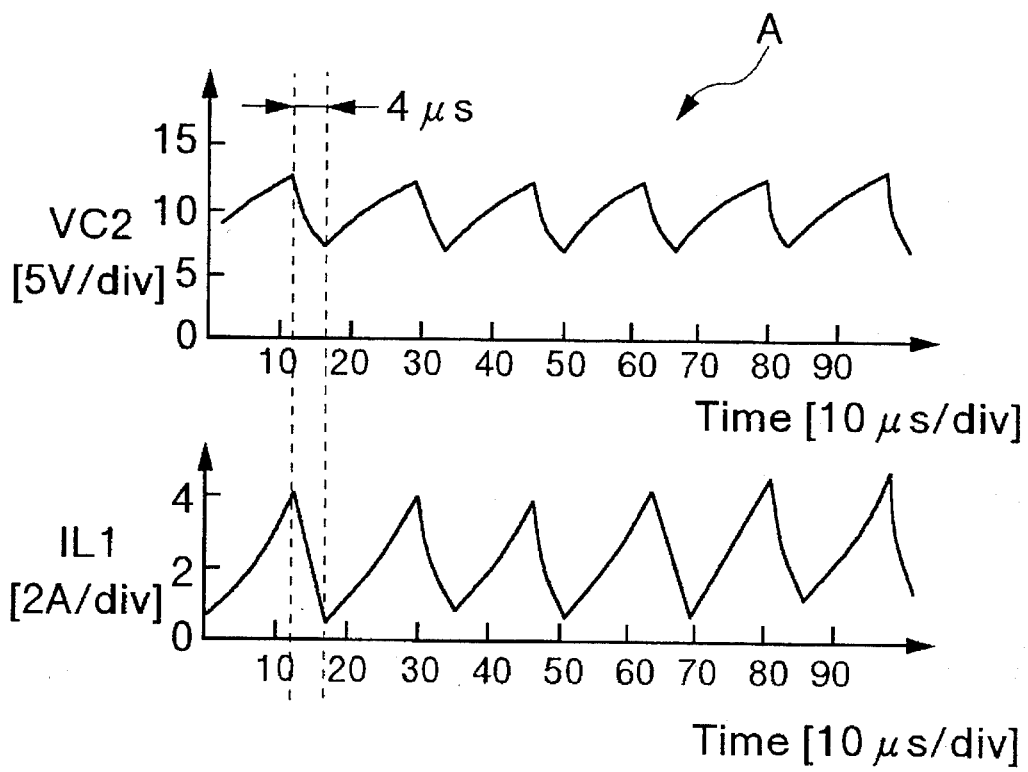
FIG. 2(b) is shown in an expanded time base.

FIG. 2 (a) shows a wave form of a current IL1 of the inductor L1 and a terminal voltage VC2 of the capacitor C2 in case that the input voltage of AC 85 V, 60 Hz is applied to the rectifying circuit 10. FIG. 2(b) is a precise view of a portion A in FIG. 2(a) with an expanded time scale. In FIGS. 1 and 2 (a), (b), since the turn on time of the switching device Q1 becomes longer when the input voltage applied to the rectifying circuit 10 is relatively low, a relatively high voltage of approximately 10 V appears between the terminals of the capacitor C2. Therefore, after the switching device Q1 turns off, the capacitor C3 is rapidly charged in approximately 4 μs through the resister R4, a diode D3 and a zener diode D2 to shorten the time period for the LOW output of the monostable multivibrator 20. That is, where a turn on time of the switching device Q1 becomes longer, the immediately following turn off time of the switching device Q1 is shortened.

Figure 3A:
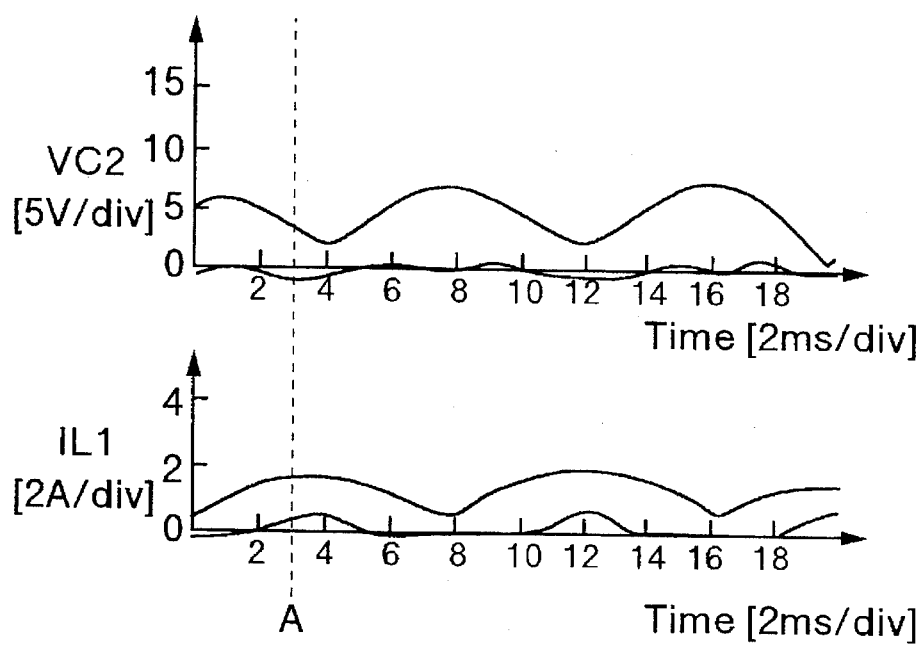
FIG. 3(a) is a wave form chart of a main part of the power supply in FIG. 1 for an ac input voltage of 264 V, 60 Hz, where
Figure 3B:
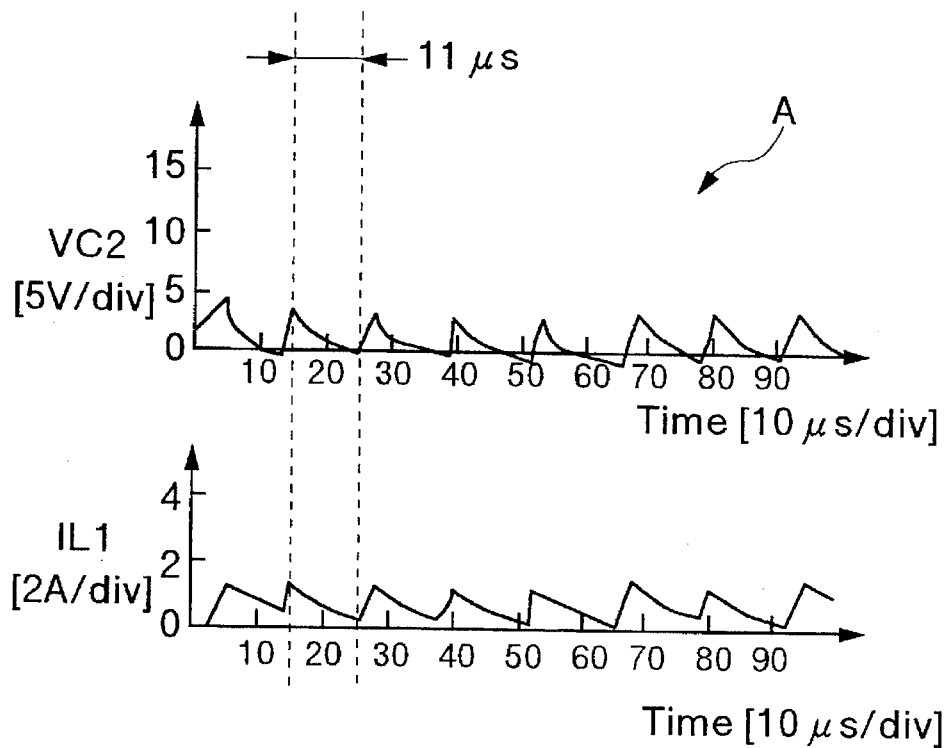
FIG. 3(b) is shown in an expanded time base.

Next, FIG. 3(a) shows a wave form of a current IL1 of the inductor L1 and a terminal voltage VC2 of the capacitor C2 in case that the input voltage of AC 264 V, 60 Hz is applied to the rectifying circuit 10. FIG. 3(b) is a precise view of a portion A in FIG. 3(a) with an expanded time scale. In FIGS. 1 and 3(a), (b), since the turn on time of the switching device Q1 becomes shorter when the input voltage applied to the rectifying circuit 10 is relatively high, a generally low voltage of approximately 5 V appears between the terminals of the capacitor C2. Therefore, after the switching device Q1 turns off, the capacitor C3 is slowly charged in approximately 11 μs through the resister R4, the diode D3 and the zener diode D2 to lengthen the time period for the LOW output of the monostable multivibrator 20. That is, where a turn on time of the switching device Q1 becomes shorter, the immediately following turn off time of the switching device Q1 is lengthened.

In the above described embodiment of this invention, substantially constant and stable dc output voltage of approx. 370 V, 0.55 A is obtained for both the input ac voltages of 85 V in FIG. 2(a), (b) and 264 V in FIG. 3(a), (b). This results in an improved stable control characteristics of the present invention by sufficiently broadened duty ratio of the switching device for wide range of input ac voltage.

In this case, the turn off time dt of the switching device Q1 determined by the multivibrator 20 is sufficiently small, though dt still varies according to the preceding turn on time. Thus, as shown in FIG. 2(a),(b) and FIG. 3(a),(b), the switching device Q1 turns on again when the current of the inductor L1 decreases below the threshold level S0 by a certain amount.

According to the above, a fluctuating range of the instantaneous input current of the inductor L1 can be suppressed. Particularly, when the inductor L1 has a large inductance, the peaks of the pulsated current through L1 can be further suppressed.

Consequently, overheating of a capacitor 18 and large line reflection noise caused by an excessive ripple current flowing into a capacitor 18 connected to the input lines are successfully prevented. In the meantime, since the peaks of the pulsated current of L1 does not become much large in case that large output current is required, the switching device Q1 does not need to have a large rated current, thus it is advantageous in manufacturing cost. Furthermore, because the switching frequency appropriately varies, noise spectrum from the chopper circuit is diffused to make it simpler to suppress noise radiation.

In addition, as shown in FIG. 1, a diode D4 and a resister R6 initialize the capacitor C3. The zener diode D2 broadens the control range of the turn off time of the switching device Q1.

The capacitor 18 arranged at the input terminals of the rectifying circuit 10 has a small capacity to absorb high frequency ripple components.

While the present invention has been discussed in terms of the preferred embodiments, the present invention should be implemented in various fashions with incorporating modifications of the disclosed embodiments in addition, omission or modification of the detailed construction, without departing from the principle of the invention. Therefore, the present invention should be understood to include all embodiments encompassed within the spirit of the invention set out in the appended claims.

What is claimed is:

1. A switching power supply, comprising:
   means for full-wave rectifying an ac input voltage;
   means for switching an output current of said rectifying means;
   means for providing a target signal to force a dc output voltage to follow a reference voltage; and
   means for controlling a switching timing of said switching means,
   wherein said controlling means repeats the operations of turning off said switching means when a switching current of said switching means complies with said target signal and turning on said switching means upon completion of a turn off time,
   and wherein a time period of said turn off time is determined based on a duration of the immediately preceding turn on time thereof.

2. A switching power supply as set forth in claim 1, wherein said switching means comprises a switching device driven with sufficiently higher frequency than that of the ac input voltage, an inductor connected in series with said switching device between output terminals of said rectifying means, and a capacitor for smoothing a current fed through said inductor to supply stabilized dc output voltage.

3. A switching power supply as set forth in claim 1, wherein said target signal has a full-wave rectified wave form, in which the phase thereof is same as that of said ac input voltage, and an amplitude corresponding to difference between said dc output voltage and said reference voltage.

4. A switching power supply as set forth in claim 1, wherein said target signal providing means comprises means for amplifying difference voltage between said dc output voltage and said reference voltage, and means for superimposing output voltage of said amplifying means on output voltage wave form of said rectifying means.

5. A switching power supply as set forth in claim 1, wherein said switching timing controlling means is further for:

shortening the turn off time of said switching means when the immediately preceding turn on time of said switching means becomes longer; and lengthening the turn off time of said switching means when the immediately preceding turn on time of said switching means becomes shorter.

6. A switching power supply as set forth in claim 5, wherein said switching timing controlling means comprises a delay circuit including a series circuit of a capacitor and a resister, and a capacitor defining a supplied current to said delay circuit.

7. A switching power supply, comprising:

a rectifying circuit for full-wave rectifying an ac input voltage to output pulsating current;

a chopper circuit comprising a switching device driven with sufficiently higher frequency than that of said ac input voltage, an inductor connected in series with said switching device between output terminals of said rectifying circuit, and a capacitor for smoothing a current fed through said inductor to supply a stabilized dc output voltage;

means for providing a threshold level signal having a full-wave rectified waveform, in which the phase thereof is the same as that of said ac input voltage, and an amplitude corresponding to an error voltage included in an output voltage of said chopper circuit; and means for controlling switching timing by repeating the operations of turning off said switching device when current therethrough reaches said threshold level signal and turning on said switching device upon completion of a turn off time, wherein a time period of said turn off time is shortened when a duration of the immediately preceding turn on time of said switching means becomes longer and lengthened when a duration of the immediately preceding turn on time of said switching means becomes shorter.

8. A switching power supply as set forth in claim 7, wherein said switching timing controlling means comprises a comparator comparing said threshold level signal with a current running through said switching device and a mono stable multivibrator turning off and on said switching device according to the output signal of said comparator.

9. A switching power supply as set forth in claim 8, wherein said mono stable multivibrator comprises a delay circuit including a series circuit of a capacitor and a resister, and a capacitor defining a supplied current to said delay circuit.

10. A switching power supply, comprising:

a rectifying circuit for full-wave rectifying an ac input voltage to output pulsating current;

a chopper circuit for switching said pulsating current from said rectifying circuit at a high frequency to provide a smoothed dc output voltage at the terminals of an output capacitor;

a current detection circuit for detecting a switching current of said chopper circuit;

an operational amplifier for detecting an error voltage of the output voltage of said chopper circuit against reference voltage;

a multiplier for multiplying an output voltage error signal from said operational amplifier by an input voltage signal of said chopper circuit; and a switching control circuit for comparing a voltage signal output from said multiplier with a current signal output from said current detection circuit and repeating the operations of turning off said chopper circuit when the current through said switching device in said chopper circuit reaches said voltage signal level and turning on said chopper circuit upon completion of a turn off time, wherein a time period of said turn off time is shortened when a duration of the immediately preceding turn on time of said switching device becomes longer and is lengthened when a duration of the immediately preceding turn on time of said switching device becomes shorter.

11. A switching power supply as set forth in claim 10, said switching control circuit comprises a series circuit of a capacitor and a resister, and a capacitor defining a supplied current to said delay circuit.

* * * * *